(12) United States Patent
Salles (10) Patent No.: US 9,107,543 B2
(45) Date of Patent: Aug. 18, 2015

(54) MULTIPURPOSE TOOL FOR MIXOLOGISTS

(71) Applicant: Joshua Salles, Larchmont, NY (US)

(72) Inventor: Joshua Salles, Larchmont, NY (US)

(*) Notice: Subject to any disclaimer, the term of this patent is extended or adjusted under 35 U.S.C. 154(b) by 266 days.

(21) Appl. No.: 13/713,470

(22) Filed: Dec. 13, 2012

(65) Prior Publication Data
US 2013/0160213 A1   Jun. 27, 2013

Related U.S. Application Data

(60) Provisional application No. 61/579,080, filed on Dec. 22, 2011.

(51) Int. Cl.
*B25F 1/04* (2006.01)
*A47J 43/27* (2006.01)

(52) U.S. Cl.
CPC ... *A47J 43/27* (2013.01); *B25F 1/04* (2013.01)

(58) Field of Classification Search
CPC .............. B25F 1/04; B25F 1/02; A47J 43/27; A47J 43/28
USPC ............. 7/118, 119, 110, 154, 155, 164, 168, 7/156, 158
See application file for complete search history.

(56) References Cited

U.S. PATENT DOCUMENTS

| | | | | |
|---|---|---|---|---|
| 260,258 | A | * | 6/1882 | Trickel ................................. 7/110 |
| 331,236 | A | * | 11/1885 | Herrick ........................ 100/213 |
| 896,746 | A | * | 8/1908 | McCarty ........................... 7/128 |
| 1,187,842 | A | * | 6/1916 | Kaas .................................. 7/168 |
| 1,199,651 | A | | 9/1916 | Arbanasin |
| 1,287,413 | A | | 10/1918 | Parrella |
| 1,956,405 | A | | 3/1933 | Toman |
| 2,578,983 | A | | 2/1947 | Primak |
| 2,886,994 | A | | 5/1959 | Hanson |
| 3,909,860 | A | | 10/1975 | Cantales |
| 4,837,932 | A | | 6/1989 | Elsener |
| 4,911,038 | A | | 3/1990 | Ferrin |
| 5,103,520 | A | | 4/1992 | Mazzo |
| 5,653,525 | A | | 8/1997 | Park |
| 5,829,965 | A | | 11/1998 | Rubalcava |

(Continued)

FOREIGN PATENT DOCUMENTS

DE  20 2004 017 766 U1  11/2004
EP        1 334 806 A1   8/2003

OTHER PUBLICATIONS

International Search Report received in corresponding PCT/US12/70598 mailed Mar. 19, 2013.

(Continued)

*Primary Examiner* — Hadi Shakeri
(74) *Attorney, Agent, or Firm* — Edell, Shapiro & Finnan, LLC (57) ABSTRACT

A multipurpose tool includes a handle with a plurality of tool arms connected with the handle. In one embodiment, one tool arm includes a muddler/reamer that includes an end portion that is rounded with a fluted outer periphery and that tapers in transverse cross-sectional dimension in a direction toward a distal end. In another embodiment, one tool arm includes at least one jigger including a cup configured to receive and retain a volume of liquid. In still another embodiment, the muddler/reamer is pivotally connected with the handle so as to extend between two jiggers when in a storage position and to be pivotally moved away from the two jiggers and from the space in relation to the handle when deployed in an operational position.

21 Claims, 7 Drawing Sheets

(56) References Cited

U.S. PATENT DOCUMENTS

| | | | |
|---|---|---|---|
| D406,997 S | 3/1999 | Robbins | |
| 6,027,224 A | 2/2000 | Schnell | |
| 6,032,553 A | 3/2000 | Brucart Puig et al. | |
| 6,125,489 A | 10/2000 | Zeller et al. | |
| 6,128,805 A | 10/2000 | Rivera | |
| D436,014 S | 1/2001 | Glesser | |
| 6,182,541 B1 | 2/2001 | Anderson et al. | |
| 6,289,768 B1 | 9/2001 | Anderson et al. | |
| 6,397,704 B1 | 6/2002 | Olaneta | |
| D468,220 S * | 1/2003 | Harris et al. | D10/46.2 |
| D468,975 S * | 1/2003 | White | D7/666 |
| 6,751,873 B2 | 6/2004 | Mattson et al. | |
| 6,752,040 B1 | 6/2004 | Paul-Alexandre et al. | |
| D500,938 S * | 1/2005 | Lee | D7/665 |
| 6,957,599 B2 | 10/2005 | Corredor et al. | |
| 7,004,049 B2 | 2/2006 | So | |
| 7,055,200 B2 | 6/2006 | Lion et al. | |
| 7,059,741 B2 | 6/2006 | Elsener | |
| D555,455 S | 11/2007 | Cheng | |
| D565,918 S | 4/2008 | Onion | |
| D568,710 S | 5/2008 | Klecker et al. | |
| D593,838 S | 6/2009 | Williams | |
| D596,911 S | 7/2009 | Carpenter et al. | |
| 7,614,322 B1 | 11/2009 | Corredor-Londono | |
| 7,698,767 B2 | 4/2010 | Clark, Jr. | |
| D633,772 S | 3/2011 | Behler | |
| 8,015,642 B1 * | 9/2011 | Oakley | 7/156 |
| 8,061,197 B2 | 11/2011 | Silvers | |
| 8,281,437 B2 * | 10/2012 | Hunkele | 7/118 |
| 8,631,722 B1 * | 1/2014 | Davis | 7/155 |
| 2003/0234188 A1 | 12/2003 | McGuyer | |
| 2005/0138736 A1 * | 6/2005 | Tarlow | 7/110 |
| 2005/0183547 A1 | 8/2005 | Corredor et al. | |
| 2006/0075570 A1 | 4/2006 | Gelfand | |
| 2006/0207390 A1 | 9/2006 | Kehoe | |
| 2007/0211562 A1 | 9/2007 | Pitsis | |
| 2011/0041348 A1 | 2/2011 | Silvers et al. | |
| 2011/0119835 A1 | 5/2011 | Bates et al. | |
| 2011/0179581 A1 | 7/2011 | Hunkele | |

OTHER PUBLICATIONS

Gimbels, "Mr. Bartender and Bar Laddie combination", Advertisement in The Milwaukee Sentinel, Dec. 4, 1954, p. 4, part 1.

* cited by examiner

MULTIPURPOSE TOOL FOR MIXOLOGISTS

CROSS REFERENCE TO RELATED APPLICATION

This application claims priority from U.S. Provisional Patent Application Ser. No. 61/579,080, entitled "Multipurpose Tool For Mixologists", and filed Dec. 22, 2011, the disclosure of which is incorporated herein by reference in its entirety.

FIELD OF THE INVENTION

The present invention pertains to a compact multi-purpose tool for use in preparing and serving mixed drinks such as alcoholic beverages.

BACKGROUND

Mixologists, whether professionals or amateurs, in commercial bars or at home, have a need for a variety of different types of tools. For example, mixologists typically need tools such as: a muddler to extract flavors from beverage ingredients, such as citrus fruit sections, by breaking or crushing the segments; a reamer to extract citrus fruit juice; a knife with a sharp or serrated blade to provide a multitude of cutting functions; a channel knife to create garnishes and decorative pieces from a lemon peel, for example; small and large jiggers to measure ingredients for beverages; a zester for peeling zest from lemons, oranges or other citrus fruit for flavoring a beverage; and a bottle opener, a corkscrew, a strainer and a stirrer to provide functions such as opening of bottles, removing corks from bottles, straining liquids, and stirring mixed beverages.

Such tools are often physically separate units and must be found and used separately. As a consequence the tools tend to clutter a bar or other work area and decrease the efficiency of the bartender who must individually locate each tool prior to use. In addition, the need to separately purchase multiple tools results in considerable expense.

It is known to provide a plurality of bartending tools as elements of a single unit. Some examples of multifunction tools may found, e.g., in U.S. Pat. No. 6,125,489 (Zeller et al) and U.S. Pat. No. 7,698,767 (Clark, Jr.), and U.S. Patent Application Pub. Nos. 2007/0211562 (Pitsis), 2011/0179581 (Hunkele), and 2011/0041348 (Silvers et al). The entire disclosures in all of these documents are incorporated herein by reference. The multi-purpose tools disclosed in these patent documents are limited in that they include only a few tools in each unit. The tool disclosed in the Hunkele application includes the largest number of tool heads, all of which fold into the handle so as to not extend therefrom in their closed positions. Specifically, the Hunkele tool has a structural form similar to that of the well known Swiss Army Knife and includes six fold out tools, namely a bottle opener, a corkscrew, a lemon peeler, a knife blade, a zester, and a wine bottle opener that functions in conjunction with the corkscrew. Thus, to serve the functions provided by the other tools listed above, a bartender must have separate individual tools.

SUMMARY

In accordance with an example embodiment of the present invention, a multipurpose tool comprises a handle including a plurality of tool arms connected with the handle, where one tool arm comprises a muddler/reamer that includes an end portion that is rounded with a fluted outer periphery and that tapers in transverse cross-sectional dimension in a direction toward a distal end.

In another example embodiment of the present invention, a multipurpose tool comprises a handle including a plurality of tool arms connected with the handle, where one tool arm comprises at least one jigger, each jigger comprising a cup configured to receive and retain a volume of liquid.

In a further example embodiment of the present invention, the multipurpose tool comprises both the muddler/reamer and two jiggers, where the muddler/reamer is pivotally connected with the handle so as to extend between two jiggers when in a storage position and to be pivotally moved away from the two jiggers and from the space in relation to the handle when deployed in an operational position.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

In accordance with the present invention, a multipurpose tool includes a structural configuration that resembles that of the well known Swiss Army Knife, in which a plurality of the tool arms for the tool are housed for storage within a main housing comprising a handle and are pivotally moved for use to an exposed position away from the handle. When in their storage positions, many of the tools fold within the handle so as to reduce the size of the tool. As described herein, some of the tools (e.g., a reamer/muddler and one or more jiggers) extend from the housing in a storage position but are aligned close together with each other to reduce the size or profile of the tool in the storage configuration. The multipurpose tool includes a number of different tools for a variety of different uses by a mixologist. The embodiments described provide an enhanced versatility in a single unit for a bartender or other mixologist.

In example embodiments, a multipurpose tool of the present invention includes a bottle opener (provided, e.g., in a fixed position in relation to the main housing), six fold out tool arms (i.e., tool arms which are pivotally movable to fold into and out of the main housing) of which some provide different tool functions, and a plurality of jiggers of different fluid capacities (provided, e.g., in fixed positions in relation to the main housing).

Figure 1:
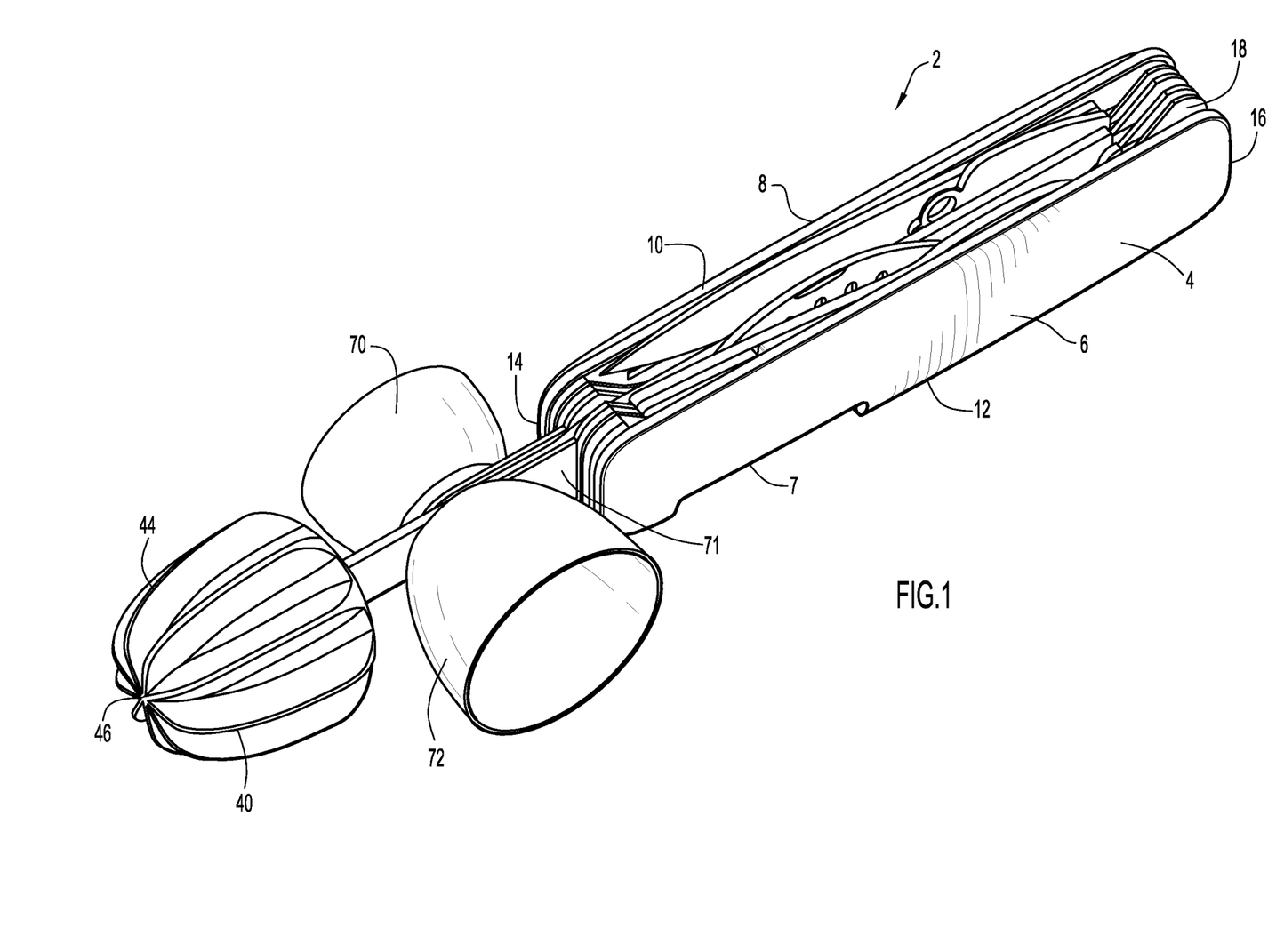
FIG. 1 is a top view in perspective showing an example embodiment of a tool of the present invention in which tool arms are located in stored positions.

Referring to the figures, an example embodiment of a multi-purpose tool 2 of the present invention includes an elongated tool handle 4 comprised of first and second spaced outer sidewalls 6 and 8 that extend generally parallel in relation to each other the length of the handle 4. The handle 4 includes a plurality of tool arms attached with the handle, where some of the tool arms are disposed within a lengthwise extending gap or space defined between the outer sidewalls 6, 8. As depicted in FIG. 1, an upper side 10 of the handle 4 has a lengthwise extending opening so as to expose the space as well as the tool arms disposed within the spacer in order to facilitate removal of one or more tool arms from their storage positions to operational positions during use of the tool 2. Thus, the handle 4 provides a housing for tool arms to be stored during periods of non-use, which minimizes the size and profile of the tool 2 when not in use.

Figure 4:
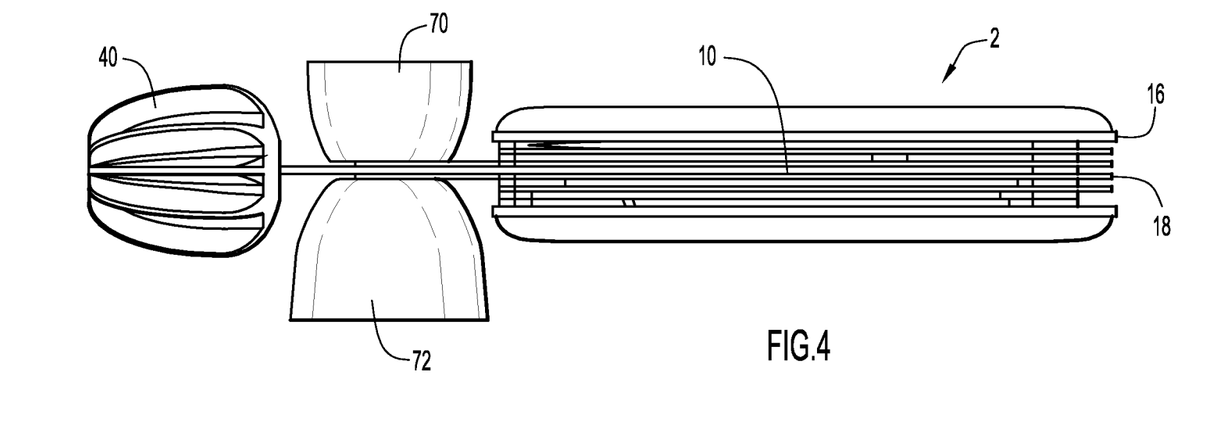
FIG. 4 is a top view in plan showing the tool of FIG. 1 with all of the tool arms in their stored positions.

A transverse pivot pin is located at a rear end 16 of the handle 4 and extends between the handle sidewalls 6, 8. Pivotally mounted to the transverse pivot pin in side-by-side relation are tool arms. In particular, referring to FIG. 8, the following five tool arms extend within the space between sidewalls 6, 8 and are pivotally connected in relation to the handle 4 and via the transverse pivot pin and are further arranged in a side-by-side orientation from sidewall 8 to sidewall 6 as follows: a knife 20, a zester/channel knife 30, a reamer/muddler 40, a strainer 50 and a stirrer 60. Separator plates 18 (see, e.g., FIGS. 1, 4 and 5) are connected with the handle 4 and provided within the space defined between sidewalls 6, 8. The separator plates 18 are spaced a suitable distance apart from each other and extend at least a portion of the length of the space between the sidewalls 6, 8 to provide a separation between tool arms 20-60 as they pivot between their storage and extended/deployed/operational positions in relation to the handle 4.

Mounted to the handle 4 at a front end 14 and at a location between the sidewalls 6, 8 is a pair of jiggers 70, 72. Each jigger 70, 72 comprises a jigger arm 71 that extends from the handle front end 14 to a hollow cup, where the outer surface of each jigger cup has a generally frustoconical shape. The cup of jigger 70 is smaller than the cup of jigger 72 and the open ends of the cups for the jiggers 70, 72 face in opposing transverse directions in relation to each other while the base portion of the jiggers 70, 72 face toward each other. The jiggers 70, 72 are further spaced a slight distance from each other to define a gap or space between the jigger base portions that is suitably dimensioned to facilitate receipt of an arm portion of the reamer/muddler 40 when the reamer/muddler is in a storage position as described herein. Each jigger 70, 72 is mounted in a fixed position in relation to the handle 4 (i.e., the jiggers 70, 72 are not pivotally movable in relation to the handle).

The jigger cups can be suitably dimensioned to receive and retain liquids and to provide any desired volumetric measurement of liquids. For example, the small jigger 70 can be dimensioned as a 1 ounce jigger (e.g., providing a fluid volumetric measuring cup of 1 ounce), while the large jigger 72 can be dimensioned as a 3 or 5 ounce jigger (e.g., providing a fluid volumetric measuring cup of 3 or 5 ounces). However, the jiggers can be dimensioned to have any other selected volumetric dimensions.

Figure 3:
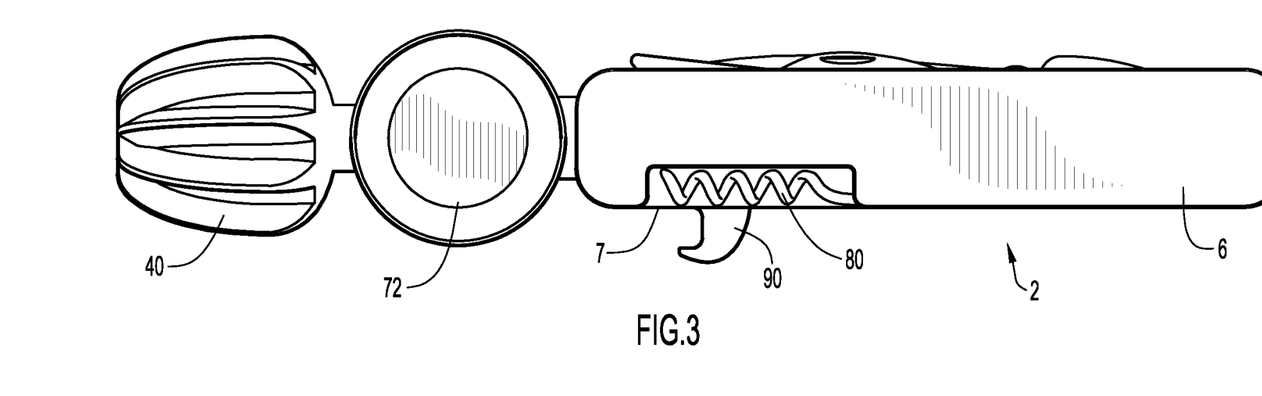
FIG. 3 is another side view in elevation that opposes the side view of FIG. 2 and shows the tool of FIG. 1 with all tool arms in their stored positions.
Figure 5:
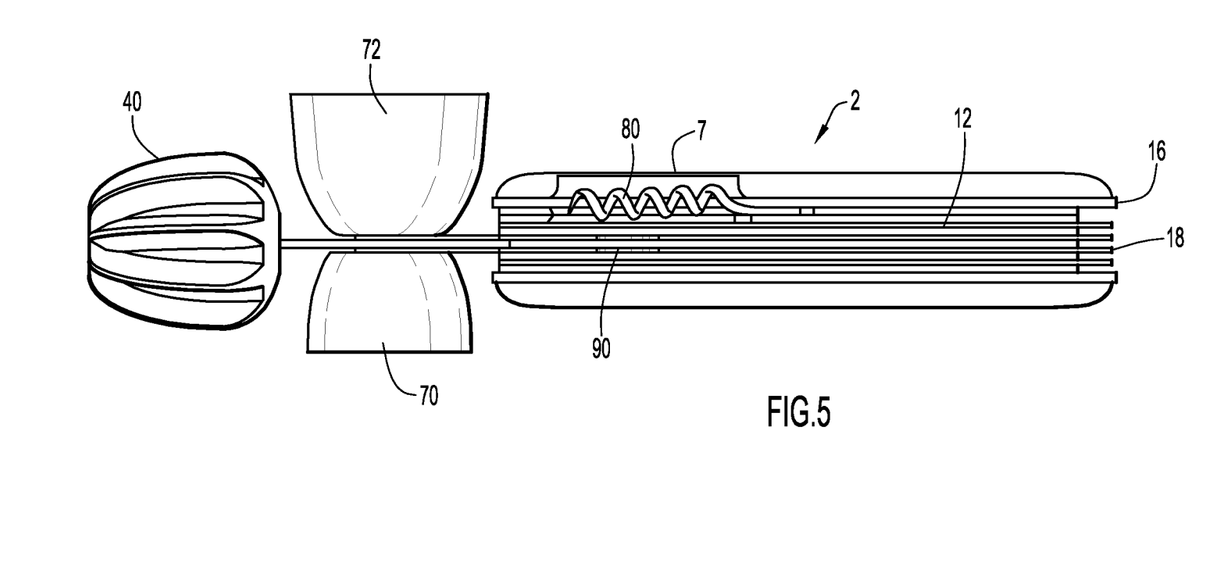
FIG. 5 is a bottom view in plan showing the tool of FIG. 1 with all of the tool arms in their stored positions.
Figure 6:
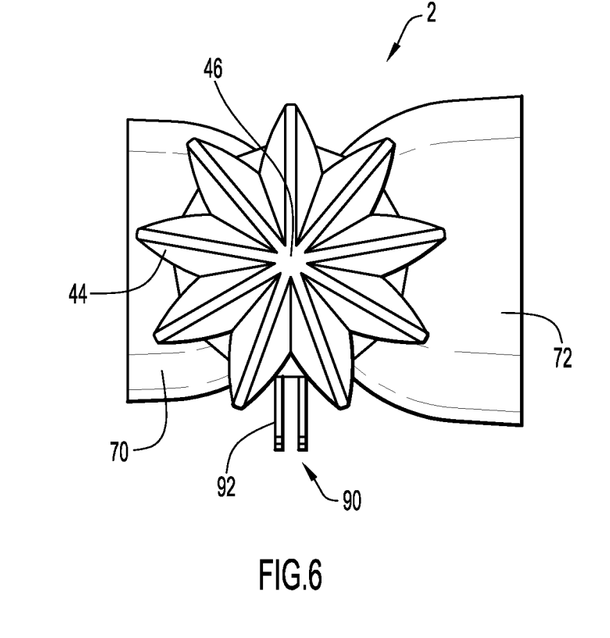
FIG. 6 is a view in plan of a front end of the tool of FIG. 1 with all of the tool arms in their stored positions.
Figure 7:
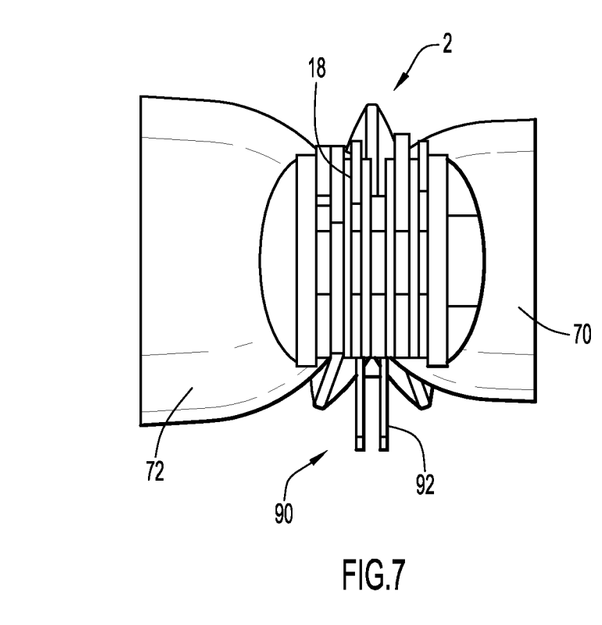
FIG. 7 is a view in plan of a rear end of the tool of FIG. 1 with all of the tool arms in their stored positions.
Figure 8:
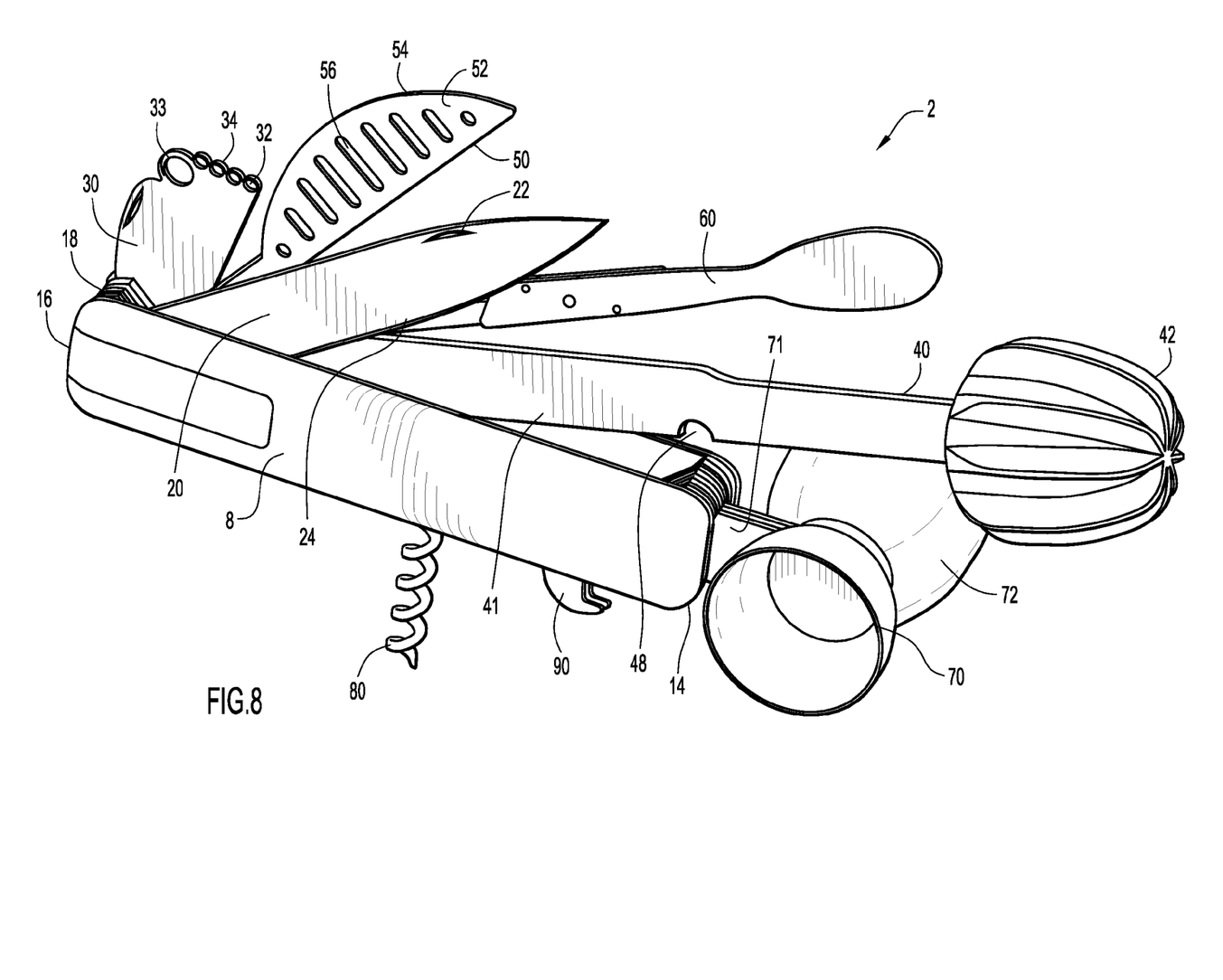
FIG. 8 is a perspective view from above showing the tool of FIG. 1 with all of the tool arms in deployed or partially deployed position from the tool handle.

Referring to FIGS. 1, 3, 5, 8 and 9, the tool 2 further includes a corkscrew 80 that is pivotally attached to sidewall 6 at a lower side 12 of the handle 4 via a corkscrew pivot pin transversely disposed between the handle sidewalls 6, 8. The handle sidewall 6 can include a cut-out section 7 at the lower side 12 that exposes the corkscrew 80 in its storage position between the sidewalls 6, 8 (as shown in FIGS. 3 and 5) and allows a user access to the corkscrew 80 to pivotally move the corkscrew 80 out of its storage position and to a deployed position away from the handle 4 (e.g., as shown in FIG. 8).

Referring to FIGS. 2, 3, 6 and 7, a bottle opener 90 is mounted in a fixed position between the sidewalls 6, 8 so as to extend from the lower side 12 of the tool handle 4. The bottle opener 90 includes a pair of rigid hook-like members 92 each spaced slightly apart from each other and including a curved edge that extends to a generally pointed end that faces the front end 14 of the handle 4. The hook-like members 92 of the bottle opener 90 are suitably dimensioned to receive and engage an underside of a bottle top or bottle cap while the lower side 12 of the handle 4 contacts a peripheral edge of the top side of the bottle top/cap so as to facilitate removal of the bottle top/cap from the bottle.

Figure 2:
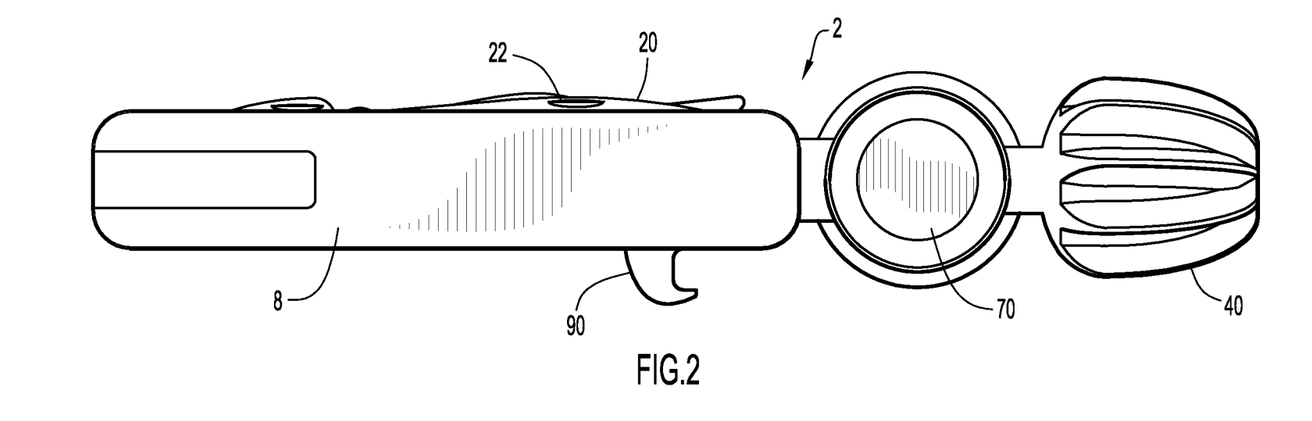
FIG. 2 is a side view in elevation showing the tool of FIG. 1 with all of the tool arms in their stored positions.
Figure 9:
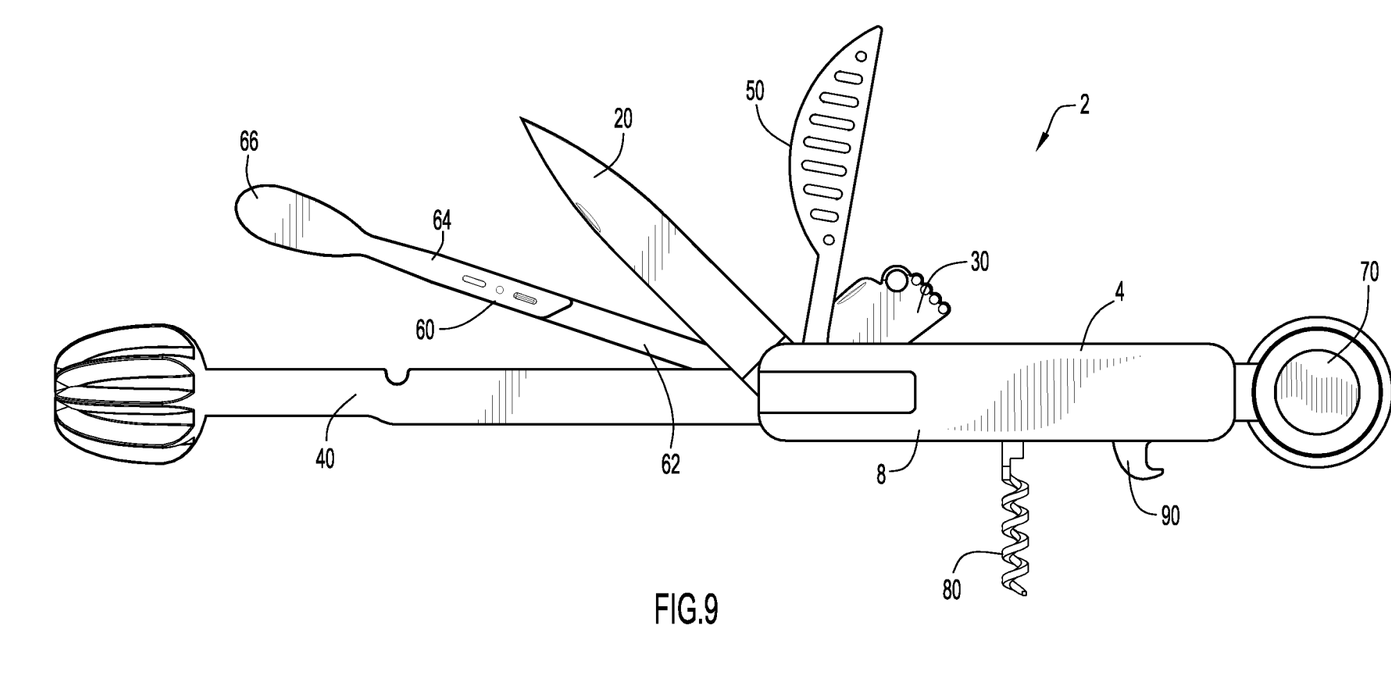
FIG. 9 is a side view in elevation showing the tool of FIG. 1 with all of the tool arms in deployed or partially deployed position from the tool handle.

Each of the tool arms 20-70, corkscrew 80, bottle opener 90, pivot pins, spacer plates 18 and other portions of the handle 4 can comprise one or more of any suitable materials, such as stainless steel, brass, aluminum and/or any other suitably non-corrosive metals. Other portions of the handle (e.g., outer side surface portions of the sidewalls 6, 8) can comprise any suitable plastic or polymer materials, while the end portion 42 of the reamer/muddler 40 can also comprise any suitable plastic or polymer materials (e.g., a nylon material such as Pantone 412 C). The materials of construction for the tool 2 are preferably selected to render the tool 2 suitable for performing the operations of cutting, slicing, shaving, straining reaming, muddling, pouring, etc., of substances including solids and liquids for consumption while further facilitating multiple washes of the tool 2 after use. In an example embodiment, various components of the tool can comprise the following materials of construction:

Knife 20—stainless steel
Zester/Channel knife 30—Stainless steel
Muddler/Reamer 40—Nylon (Pantone 412 C) molded over Stainless steel arm
Strainer 50—stainless steel
Stirrer 60—stainless steel
Jiggers 70, 72—stainless steel
Corkscrew 80—stainless steel
Bottle Opener 90—stainless steel
Lever Springs—stainless steel
Separator Plates 18 between tool arms 20-60—aluminum
Pivot pins—Brass
Outer surface portions of the sidewalls 6, 8—glossy ABS (Pantone 195 c) overmolded with matte TPR (Pantone Black 6 U) grip Each of the tool arms 20-60 and the corkscrew 80 can also be pivotally attached to their respective pivot pins utilizing one or more lever springs (e.g., also made of stainless steel) that are configured to positionally bias the pivotable tool arms and corkscrew in one or more deployed or operational positions relative to the handle. In particular, each of the tool arms 20-60 can be pivotally moved from a storage position (as shown in FIG. 1) to a deployed or operational position (e.g., as shown in FIGS. 8 and 9). In the storage position, each of the tool arms 20-60 resides between the handle sidewalls 6, 8 with a small portion of its tool projecting upward from the top side 10 of the handle 4 (as depicted in FIGS. 2 and 3) in order to permit the tool to be gripped and pivoted outward from the sidewalls 6, 8 and away from the handle 4. The lengths of the tool arms 20, 30, 50 and 60 are such that, in the stored tool position, each tool arm fits within the space between the sidewalls 6, 8 of the handle 4. As described herein, the muddler/reamer 40, when in the storage position, includes a portion that rests within the space between the sidewalls 6, 8 but also includes a portion that extends beyond the front end 14 of the handle 4 within the gap or space between the two jiggers 70, 72.

Each tool arm 20, 30, 50 and 60 can include a small notch along one side of the small tool portion that projects from the top side 10 of the handle 4 (e.g., notch 22 for knife 20, as shown in FIG. 2) to provide a gripping portion that allows a user (e.g., utilizing a thumb and forefinger of the user) to pivot the tool arm from its storage position into a suitable operational position.

Each tool arm 20-70 may be individually pivoted at any suitable angle from its stored position to its operational position where it projects from the handle 4. For example, a tool arm can be pivoted at about 180° longitudinally from the front end 14 of the handle 4 (e.g., the operational position of the muddler/reamer 40 as depicted in FIG. 9). Alternatively, a tool arm can be pivoted at any one or more other suitable angles (e.g., 45°, 90°, 135°, etc.) from its stored position to an operational position, as depicted for various tool arms in FIG. 9. Thus, each tool arm can be deployed to different operational positions in relation to the tool handle 4 depending on a position desired by a user for a particular use of the tool 2. The lever spring(s) associated with the tool arms can be configured such that each tool arm is releasably locked in an operational position at a specific angle in relation to its storage position (e.g., at an angle of about 180°). The corkscrew 80 is also pivotable in a similar manner away from the lower side 12 of the handle 4 at one or more suitable angles (e.g., 45°, 90°, etc.) from a storage position to one or more other suitable operational positions when it is desired for use.

The knife 20 includes a sharpened edge 24 that faces toward the handle 4 such that, in its storage position, the knife edge 24 is enclosed within the space between the sidewalls 6, 8. The knife 20 can be used for any suitable cutting operations including, without limitation, slicing and dicing of fruits, vegetables, meats, condiments and/or any other suitable ingredients.

The zester/channel knife 30 provides two tools on the same tool arm, namely, a zester knife toll tool and a channel knife tool. Referring to FIGS. 8 and 9, the zester/channel knife 30 comprises a thin plate having a generally rectangular configuration in an extended/deployed/operational position from the handle 4 and includes a zester portion comprising a series of small holes 32 extending through the thin plate and arranged in a generally linear manner close or proximate a distal edge of the zester/channel knife 30. In addition, a larger hole 33 (i.e., a hole 33 having a larger diameter or dimension than the other holes 32) also extends through the thin plate at a location proximate the small holes 32. A side surface of the zester/channel knife 30 tapers from the small holes 32 to the distal edge of the knife 30 so as to define a tapered edge portion comprising an undulating taper edge surface 34 defined by alternating concave and convex surfaces at the distal edge. The zester portion of the zester/channel knife 30, which is defined by the holes 32 and the corresponding tapered edge surface 34 adjacent such holes 32, facilitates the shaving and formation of small pieces or flakes of peel (also referred to as zest) from a lemon, orange or other citrus fruit when the openings 32 are scraped across the surface of the fruit. The channel knife portion, defined by hole 33 and the corresponding tapered edge surface 34 adjacent hole 33, facilitates the cutting or shaving of long ribbon-like strips of peel from the fruit (e.g., to use as garnish, such as when making a garnish twist).

The reamer/muddler 40 is sufficiently long such that, in its stored position, a tool arm 41 of the reamer/muddler 40 extends through the handle beyond the front end 14 between the cups of the jiggers 70, 72, such that its end portion 42 extends beyond the jiggers 70, 72. The end portion 42 of the reamer/muddler 40 comprises a generally tulip-shaped member having a generally rounded configuration that tapers in transverse cross-sectional dimension in a direction toward a closed circular distal end 46. A rigid longitudinal peripheral section 44 of the end portion 42 has a fluted configuration comprising a series of angularly alternating ridges and troughs extending longitudinally from the base to the distal end 46 (see, e.g., FIGS. 1 and 6). The flat circular distal end 46 serves to provide a muddler function by being forced down onto and crushing or breaking down mint, parsley or fruit and the like. In some embodiments, the distal end wall may be provided apertures sized to permit liquid to flow therethrough while preventing passage of solids such as seeds. The ridges and troughs on the longitudinal periphery 44 provide the reamer function when the end portion 42 is rotated about the central axis of the reamer/muddler 40 against an interior wall of a lemon or other citrus fruit or any other interior curved surface portion (e.g., a cup or mortar).

A rounded notch 48 is provided in the tool arm 40, and this notch 48 is aligned to correspond and receive a ridge within the space between the sidewalls 6, 8 of the handle 4 when the reamer/muddler 40 is in its storage position. In this position, the notch 48 serves to secure the reamer/muddler 40 in relation to the handle. During use of the reamer feature of the reamer/muddler 40, such as juicing a fruit, the reamer/muddler 40 can be maintained in its storage position to keep any undesired wiggle movements of the reamer/muddler 40 to a minimum when twisting and pushing the end portion 42 against the portion of fruit to be juiced.

Although the reamer function and muddler function are typically provided in two different tools, these two functions are encompassed within a single tool arm and further within a single tool head in accordance with the present invention. The muddler end portion 46 of the reamer/muddler 40 comprising a flat bottomed end can be used, e.g., to crush and breakdown items such as mint, parsley, etc. The rigid and rounded peripheral portion 44 including a fluted surface functions as a separate tool, such as a reamer used for juicing oranges, lemons and limes.

The strainer 50 comprises a flat plate member 52 including an outwardly curved or convex edge 54 facing outward and away from the tool handle 4, where the flat plate member 52 includes a plurality of slots 56 extending through the plate member 52 in a direction transverse the lengthwise dimension of the plate member 52 to facilitate straining of liquids through the slots 56 (e.g., when the strainer 50 is brought proximate to or engages with the lid of a cup or container that holds a liquid).

Referring to FIG. 9, the stirrer 60 comprises an elongated first arm member 62 that is pivotally connected with the pivot pin disposed between the sidewalls 6, 8 of the handle 4 and an elongated second arm member 64 pivotally connected to the first arm member 62. At a terminal end of the second arm member 64 is generally elliptic shaped member 66 that facilitates stirring of contents when the stirrer 60 is in a deployed and operational position. The stirrer 60 is stored within the handle space between the sidewalls 6, 8 in a folded configuration, where the second arm member 64 is folded, via its pivot connection with the first arm member 62, into a side-by-side arrangement adjacent the first arm member 62 so as to reduce the length of the stirrer 60 thus allowing it to fit within the lengthwise space of the handle 4. When deployed for use, the stirrer 60 is pivoted out from the handle space to its operational position, and the second arm member 64 is pivoted away from the first arm member 62 to an extended position in which the second arm member 64 is releasably locked with the first arm member 62 (as depicted in FIGS. 8 and 9).

Figure 10A:
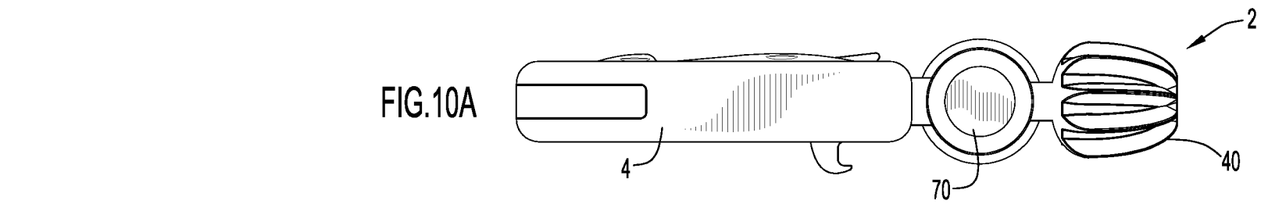
FIGS. 10A-10C are side views in elevation showing the tool of FIG. 1 with the a transition of the muddler tool arm being moved from a storage position located between double jigger tool arms to a deployed position located away from the double jigger tool arms.
Figure 10B:
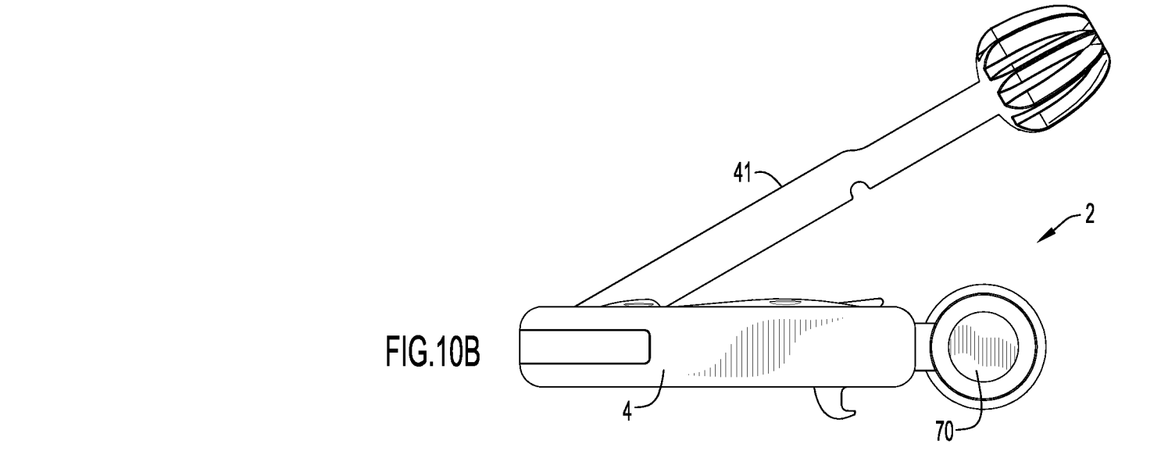
Figure 10C:
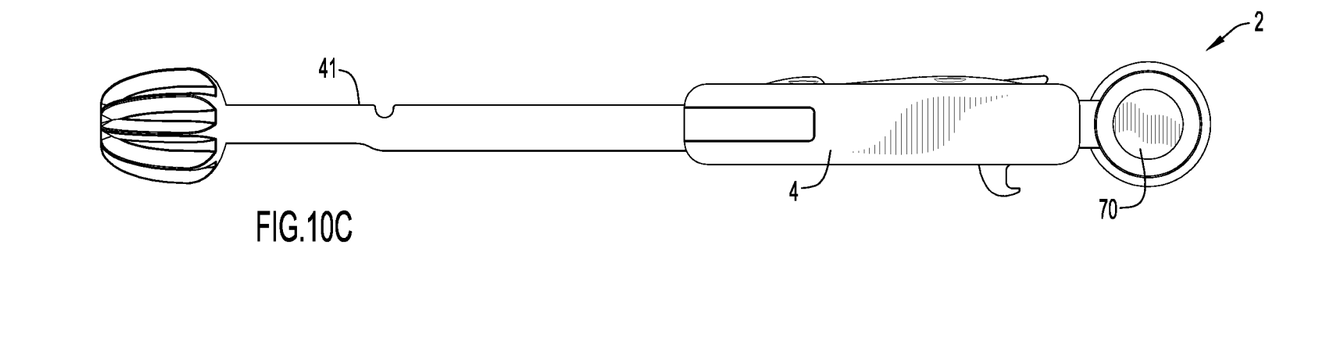

During operation of the tool 2, any one or more tool members, namely, the knife 20, zester/channel knife 30, reamer/muddler 40, strainer 50, stirrer 60, jiggers 70 and 72, corkscrew 80 and bottle opener 90 can be utilized separately or together with other tool members for a particular operation. An example of deploying the reamer/muddler 40 is depicted in the sequence of movements shown in FIGS. 10A-10C. As can be seen, the reamer/muddler tool arm 41 is moved from its storage position between the jigger arms 71 of the jiggers 70, 72 to a final, deployed or operational position which is displaced about 180° from its storage position. As previously noted, the reamer/muddler 40 is used for reamer functions when in the storage position of FIG. 10A, since the notch 48 engaged with the ridge within the handle 4 secures the reamer/muddler 40 from wiggling while it is being used to ream fruits or other items. It is also noted that the reamer/muddler 40 can also be used for its muddler functions when in the storage position for the same reasons (e.g., to prevent wiggling movements while the distal end 46 of the end portion 42 is pressed against items). The reamer/muddler 40 can optionally be moved to its position in FIG. 10B or FIG. 10C to provide separation between the reamer/muddler 40 and the jiggers 70 and 72 (e.g., if the jiggers 70, 70 are being used).

Other tool arms of the tool 2 can be deployed for use in a similar manner. In particular, any one or more of the knife 20, zester/channel knife 30, reamer/muddler 40, strainer 50, stirrer 60 and corkscrew 80 can be pivoted away their storage positions proximate the handle 2 to one or more deployed positions extended away from the handle 2 for use in the operation. For example, a bartender might require use of the knife 20 and/or zester/channel knife 30 to cut portions of a lemon or make peelings or small flakes used for a particular food or beverage product, while also requiring the reamer or muddler functions of the reamer/muddler 40 for the lemon, while further still requiring the use of one or both jiggers 70, 72 to measure precise volumetric amounts of a liquid during the operation. Conventionally, these operations would require multiple tools to achieve the desired operations. However, the tool 2 of the present invention provides all of these features as well as others in a single tool.

Thus, the tool of the present invention is an essential item for mixologists/bartenders that incorporates the most popularly used tools in cocktail making or other types of food or beverage preparations. In particular, the combination of the different types of tool components as described herein within a single tool renders the tool multifunctional for a variety of purposes. In particular, combining the reamer and muddler functions as well as jigger functions within the same tool, with the further feature of combining reamer and muddler functions within the same tool arm, are just some very important and useful features of the tool. Further, the compact profile of the tool 2 when all the tool arms or other tool members are in their storage positions (e.g., with the reamer/muddler 40 being located between the two jiggers 70, 72) facilitates easy storage of the multipurpose tool when it is not in use.

Having described example embodiments of a multipurpose tool for mixologists, variations and changes will be suggested to those skilled in the art in view of the teachings set forth herein. It is therefore to be understood that all such variations, modifications and changes are believed to fall within the scope of the present invention as defined by the appended claims.

What is claimed:

1. A multipurpose tool comprising:
    a handle including a space and a plurality of tool arms connected with the handle,
    wherein one tool arm comprises a muddler/reamer having an end portion that is rounded with a fluted outer periphery and that tapers in transverse cross-sectional dimension in a direction toward a distal end,
    wherein the multipurpose tool further comprises two jiggers extending from an end of the handle, each jigger comprising a cup configured to receive and retain a volume of liquid, and
    wherein the muddler/reamer is pivotally connected with the handle so as to extend between the two jiggers when in a storage position and to be pivotally moved away from the two jiggers and from the space in relation to the handle when deployed in an operational position.

2. The multipurpose tool of claim 1, wherein an opening of each cup is aligned in relation to the handle such that the cup openings of the two jiggers face away from each other and a space is defined between the jigger cups, and a portion of the muddler/reamer fits within the space defined between the jigger cups.

3. The multipurpose tool of claim 1, wherein the multipurpose tool further comprises at least one of a knife, a zester/channel knife, a strainer, a stirrer, a corkscrew and a bottle opener.

4. The multipurpose tool of claim 1, wherein the multipurpose tool further comprises a stirrer, the stirrer comprising a first arm member that pivotally connects with the handle and a second arm member that pivotally connects with the first arm member.

5. The multipurpose tool of claim 1, wherein the multipurpose tool further comprises a combined zester knife tool and a channel knife tool incorporated into a single tool arm, the zester knife tool comprising a plurality of spaced first holes in alignment with each other, and the channel knife tool comprising a second hole having a larger dimension than the first holes.

6. The multipurpose tool of claim 1, wherein the fluted outer periphery is a series of angularly alternating ridges and troughs extending longitudinally from a base of said end portion to the distal end of said end portion.

7. The multipurpose tool of claim 1, wherein the one tool arm includes a notch which aligns with a ridge in the space of the handle when the muddler/reamer is in a storage position to secure the muddler/reamer in relation to the handle to minimize wiggle movements of the muddler/reamer.

8. A multipurpose tool comprising:
    a handle including a plurality of tool arms connected with the handle,
    wherein one tool arm comprises two jiggers extending from an end of the handle, each jigger comprising a cup configured to receive and retain a volume of liquid, and
    wherein the multipurpose tool further comprises a tool that is pivotally connected with the handle so as to extend between the two jiggers when in a storage position and to be pivotally moved away from the two jiggers in relation to the handle when deployed in an operational position.

9. The multipurpose tool of claim 8, wherein one jigger cup is configured to receive and retain a larger volume of liquid than the other jigger cup.

10. The multipurpose tool of claim 8, wherein an opening of each cup is aligned in relation to the handle such that the cup openings of the two jiggers face away from each other and a space is defined between the jigger cups, and a portion of the tool that is pivotally connected with the handle fits within the space defined between the jigger cups.

11. The multipurpose tool of claim 8, wherein the tool pivotally connected with the handle comprises a muddler/reamer.

12. The multipurpose tool of claim 8, wherein at least some of the tool arms are pivotally connected with the handle so as to at least partially fit within a space defined within the handle when in a storage position and to be pivotally moved from the space in relation to the handle when deployed in an operational position.

13. The multipurpose tool of claim 8, wherein the multipurpose tool further comprises at least one of a knife, a zester/channel knife, a strainer, a stirrer, a corkscrew and a bottle opener.

14. The multipurpose tool of claim 8, wherein the multipurpose tool further comprises a stirrer, the stirrer comprising a first arm member that pivotally connects with the handle and a second arm member that pivotally connects with the first arm member.

15. The multipurpose tool of claim 14, wherein the stirrer further comprises:
   a folded configuration in which the second arm member is folded via a pivot connection into a side-by-side arrangement adjacent the first arm member so as to reduce the length of the stirrer, allowing the stirrer to fit lengthwise within a space defined within the handle; and
   a deployed configuration in which the stirrer is pivoted out from the handle space to an operational position and the second arm member is pivoted away from the first arm member to a lengthwise extended position in which the second arm member is releasably locked with the first arm member.

16. The multipurpose tool of claim 8, wherein the multipurpose tool further comprises a combined zester knife tool and a channel knife tool incorporated into a single tool arm, the zester knife tool comprising a plurality of spaced first holes in alignment with each other, and the channel knife tool comprising a second hole having a larger dimension than the first holes.

17. A multipurpose tool for use in tending bar comprising:
   a handle including elongated spaced outer sidewalls extending generally parallel to each other and a plurality of tool arms connected with the handle, the spaced outer sidewalls defining an elongated space with the handle, wherein at least some of the tool arms are pivotally connected with the handle so as to at least partially fit within the space defined within the handle when in a storage position and to be pivotally moved from the space in relation to the handle when deployed in an operational position; and
   a combination muddler and reamer tool pivotally connected with the handle, wherein a first portion of the combination muddler and reamer tool is configured to extend within the space defined within the handle and a second portion of the combination muddler and reamer tool is configured to project from an end of said handle when the combination muddler and reamer tool is in a storage position.

18. A multipurpose tool for use in tending bar comprising:
   a handle including a plurality of tool arms connected with the handle;
   wherein at least some of the tool arms are pivotally connected with the handle so as to at least partially fit within a space defined within the handle when in a storage position and to be pivotally moved from the space in relation to the handle when deployed in an operational position; and
   wherein at least one of the pivotally connected tool arms is strainer comprising a flat plate member including an outwardly convex edge facing outward and away from the handle, and wherein a plurality of slots are defined through the plate member and extend in a direction transverse to the lengthwise dimension of the plate member to facilitate straining of liquids through the slots when the strainer is brought proximate an open end of a container for a liquid.

19. A multipurpose tool comprising:
   a handle including a plurality of tools connected with the handle,
   wherein one tool of the plurality of tools comprises two jiggers extending from an end of the handle, each jigger comprising a cup configured to receive and retain a volume of liquid, and
   wherein another tool of the plurality of the tools is pivotally connected with the handle so as to extend between the two jiggers when in a storage position and to be pivotally moved away from the two jiggers in relation to the handle when deployed in an operational position.

20. The multipurpose tool of claim 19, wherein said another tool comprises a muddler/reamer.

21. A multipurpose tool for use in tending bar comprising:
   an elongated handle including opposed ends and spaced sidewalls extending generally parallel to each other, the opposed ends and the spaced sidewalls defining an elongated space within the handle;
   a plurality of tool arms connected with the handle, at least one of the tool arms being a muddler/reamer pivotally connected with the handle at one of the opposed ends;
   wherein the muddler/reamer is pivotably movable between a storage position and at least one operational position,
   wherein the muddler/reamer tool arm has a first portion which fits within the space defined within the handle and a second portion that extends beyond the other opposed end of the handle when in the storage position, and
   wherein the muddler/reamer tool arm is pivotally movable at about 180° longitudinally from the storage position to the at least one operational position such that the first and second portions of the muddler/reamer tool arm extend beyond the one opposed end of the handle.

* * * * *